(12) United States Patent
Randone

(10) Patent No.: US 6,395,369 B1
(45) Date of Patent: May 28, 2002

(54) GARAGE DOOR MESSAGE BANNER

(76) Inventor: Charles J. Randone, 7423 Washington St., Ralston, NE (US) 68127

( * ) Notice: Subject to any disclaimer, the term of this patent is extended or adjusted under 35 U.S.C. 154(b) by 0 days.

(21) Appl. No.: 09/456,956

(22) Filed: Dec. 7, 1999

(51) Int. Cl.[7] ................................................ B32B 3/06
(52) U.S. Cl. ...................... 428/99; 428/192; 428/913.3; 428/904.4; 428/542.2; 362/267; 362/124; 362/61; 362/80; 362/237; 362/32
(58) Field of Search ...................... 428/99, 192, 913.3, 428/904.4, 542.2; 362/267, 124, 61, 80, 237, 32

(56) References Cited

U.S. PATENT DOCUMENTS

| | | | |
|---|---|---|---|
| 3,766,960 A | * 10/1973 | McLaughlin, Jr. | .......... 160/405 |
| 5,436,817 A | * 7/1995 | Wotton et al. | .............. 362/267 |
| 5,649,390 A | * 7/1997 | Davidson | .......................... 52/3 |
| 5,937,587 A | * 8/1999 | Zinbarg | ............................ 52/3 |

* cited by examiner

Primary Examiner—Blaine Copenheaver
Assistant Examiner—Hai Vo
(74) Attorney, Agent, or Firm—Suiter & Associates PC

(57) ABSTRACT

A garage door banner for partially covering the front of a conventional garage door. The banner is easily attached so as not to change its position after successive up and down garage door cycling operations. The banner is attached via elastic strips to the top and bottom edges of a conventional garage door. Illumination may also be provided so as to add decoration and visibility.

7 Claims, 4 Drawing Sheets

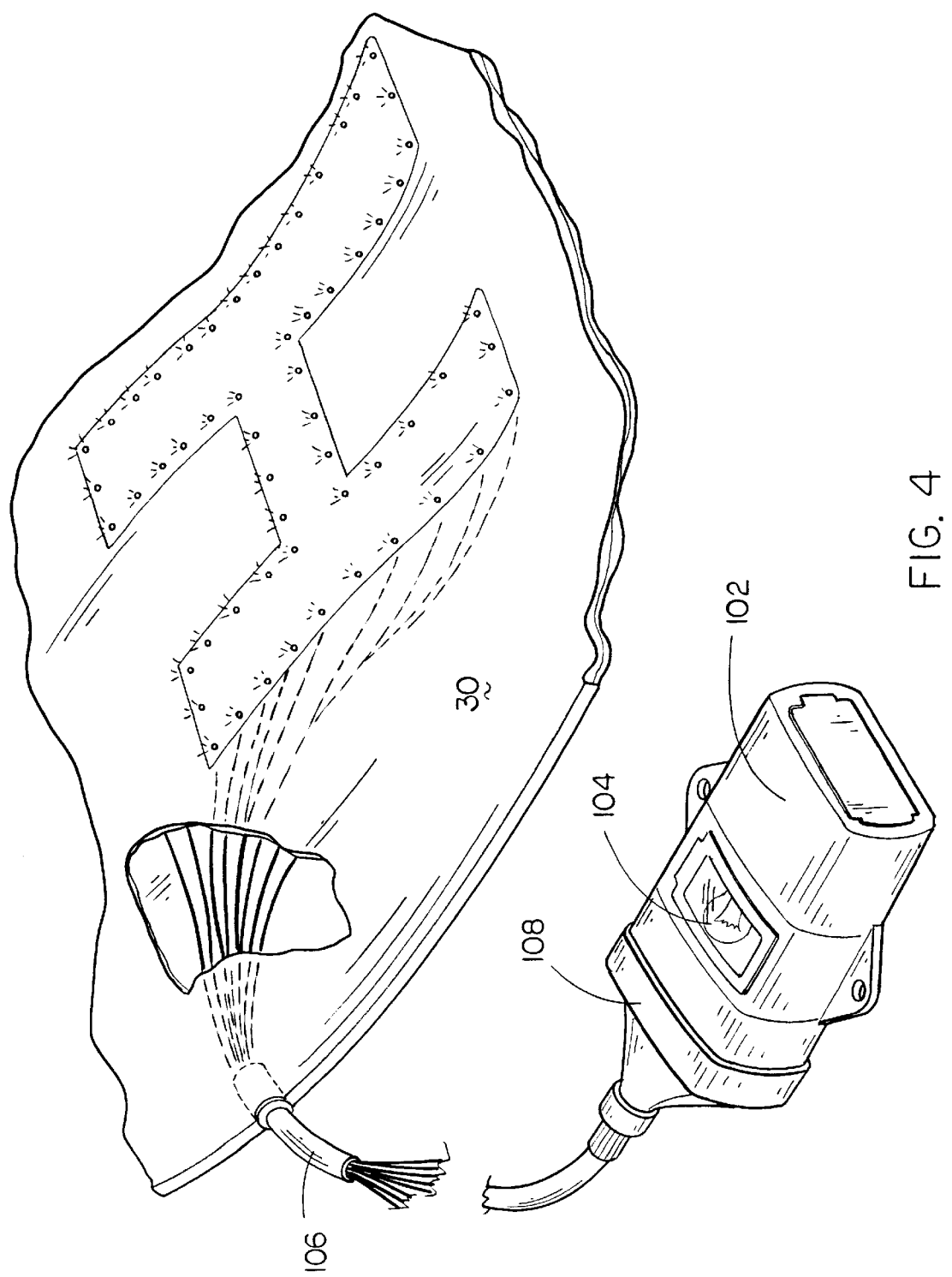

GARAGE DOOR MESSAGE BANNER

FIELD OF THE INVENTION

The present invention generally relates to garage door covers and more particularly to a non-shifting and easily replaceable and durable garage door banner which may be removeably affixed to a conventional hinged garage door so as to provide a highly visible display of useful or seasonal information.

BACKGROUND OF THE INVENTION

Most modern dwellings include either an attached or unattached garage or vehicle storage area. Such facilities are commonly utilized to store vehicles as well as gardening items and the like. Primary ingress and egress to these facilities is generally provided by a large opening. Such openings are of course suitable for moving large items such as vehicles in and out of the garage. A garage door is most commonly provided to secure the interior of the garage from the environment.

Garage doors are generally mounted between two L-shaped door tracks. Each of these L-shaped tracks has a vertical portion for securing the garage door behind the garage door opening, and a horizontal portion for securing the garage door both above and behind the garage door opening (so as to provide unencumbered passage in an out of the garage door opening). In this fashion, the garage door may be lifted and displaced about the vertical axis of the opening and into a position above, behind, and perpendicular to the vertical axis of the opening.

Most conventionally, a plurality of rollers is mounted along the vertical edges of the garage door. These rollers are guideably retained within and between the two L-shaped door tracks. In practice, to open such a garage door a resident simply grasps the garage door handle and imparts first a lifting and then throwing force so as to move the garage door into its storage position. To close the door a resident simply applies opposite forces to the garage door handle.

Recently garage door openers have been provided for automatically lifting (opening) and lowering (closing) garage doors. Another improvement in the art are multi-panel doors. Such multi-panel doors include at least two or more panels hinged together along a horizontal axis. These multi-panel doors are easier to open, less noisy, and more durable. However, because these multi-paneled doors are hinged so as to bend generally into a arc during opening and closing operations they increase in height by the sum of their hinge opening distance.

Many individuals decorate the exteriors of their homes and more particularly decorate their home during various seasons with a seasonal motif. Additionally, various individuals charged with renting or selling dwellings are desirous of placing indicia so as to inform the public a particular residence is for sell, for rent, or open for touring. Further, many realtors and the like provide informational brochures in mailbox type enclosures at residences which are for sale or rent. In this way passing motorists or pedestrians may obtain information regarding a dwelling.

Known to the art are garage door covers designed to be removeably mounted to the exterior of a garage door. For example, Davidson, U.S. Pat. No. 5,649,390, teaches a one piece decorative garage door cover for mounting on the exterior of a garage door. This device includes a cover slightly larger than the door for which it is to be mounted, and a rather complex hardware system for attaching the cover directly to the backside of the garage door. As the door is moved from one position to another (e.g., from closed to open or from open to closed) the mounting hardware stretches to accommodate door panel hinging. Over time this mounting system causes the cover to shift in relation with the door. Also known to the art is Zinbarg, U.S. Pat. No. 5,943,803. Zinbarg teaches a garage door decorative cover for mounting on a multi-panel garage door. This device includes a cover for at least two of the door panels. In this fashion the individual panel covers need not compensate for door panel hinging. However, the Zinbarg device is difficult to install and registration of the printed motif is difficult to obtain and maintain as the door cycles. The individual panels also increase printing, installation, and maintenance costs.

SUMMARY OF THE INVENTION

The present invention provides a non-shifting message banner for garage doors which may be easily removably attached to a garage door. The present invention provides a visible message banner which may include printed indicia and lighting.

It is an object of the present invention to provide a highly visible form of advertising and marketing for displaying informational or seasonal data and decoration on existing garage doors.

It is another object of the present invention to provide a non-shifting garage door cover which may be attached to the exterior surface of a garage door without interfering with normal garage door operation.

It is yet another object of the present invention to provide a single panel garage door banner which may be readily mounted to a conventional multi-panel garage door.

It is still another object of the present invention to provide a single sheet garage door banner which elastically conforms to a conventional multi-panel garage door without adversely effecting the seal of a garage door within the garage door frame.

It is still yet another object of the present invention to provide a garage door banner which may include lighting to both increase visibility and add a decorative motif.

These and other objects will be apparent to the skilled practitioner and are most readily achieved by providing a banner sized smaller than the garage door to which the banner is to be attached. The banner includes, in a preferred embodiment, three top edge banner elastic members having three associated generally flat U-shaped banner retention clips, and three bottom edge banner elastic members having three associated generally flat U-shaped banner retention clips.

The banner of the present invention may be mounted by placing the banner over the front of the garage door while the garage door is partially open such that the U-shaped clips of the top of the banner may be secured to the top of the garage door, and the U-shaped clips of the bottom of the banner may be secured to the bottom of the garage door. The U-shaped clips are preferably fabricated of a thin durable material so as to provide garage door securement without effecting the door/frame seal. Likewise, because the banner is neither attached to the back of the door, nor required to envelope the door, it is less likely to shift during door cycling. Furthermore, the banner of the present invention is low in cost and easy to install, replace, and maintain.

Significantly, the banner retention system of the present invention accommodates sufficient movement of the banner to allow for complete opening and closing of the garage door in a safe and efficient manner while also preventing the banner from riding up or down during garage door operation.

BRIEF DESCRIPTION OF THE DRAWINGS

The invention will be described in detail with references to the following drawings wherein:

FIG. 4 is a perspective view of the present invention illustrating an illuminated banner utilizing a battery-pack and fiber-optics for decoratively illuminating areas of the banner;

DETAILED DESCRIPTION OF PREFERRED EMBODIMENTS

Figure 1:
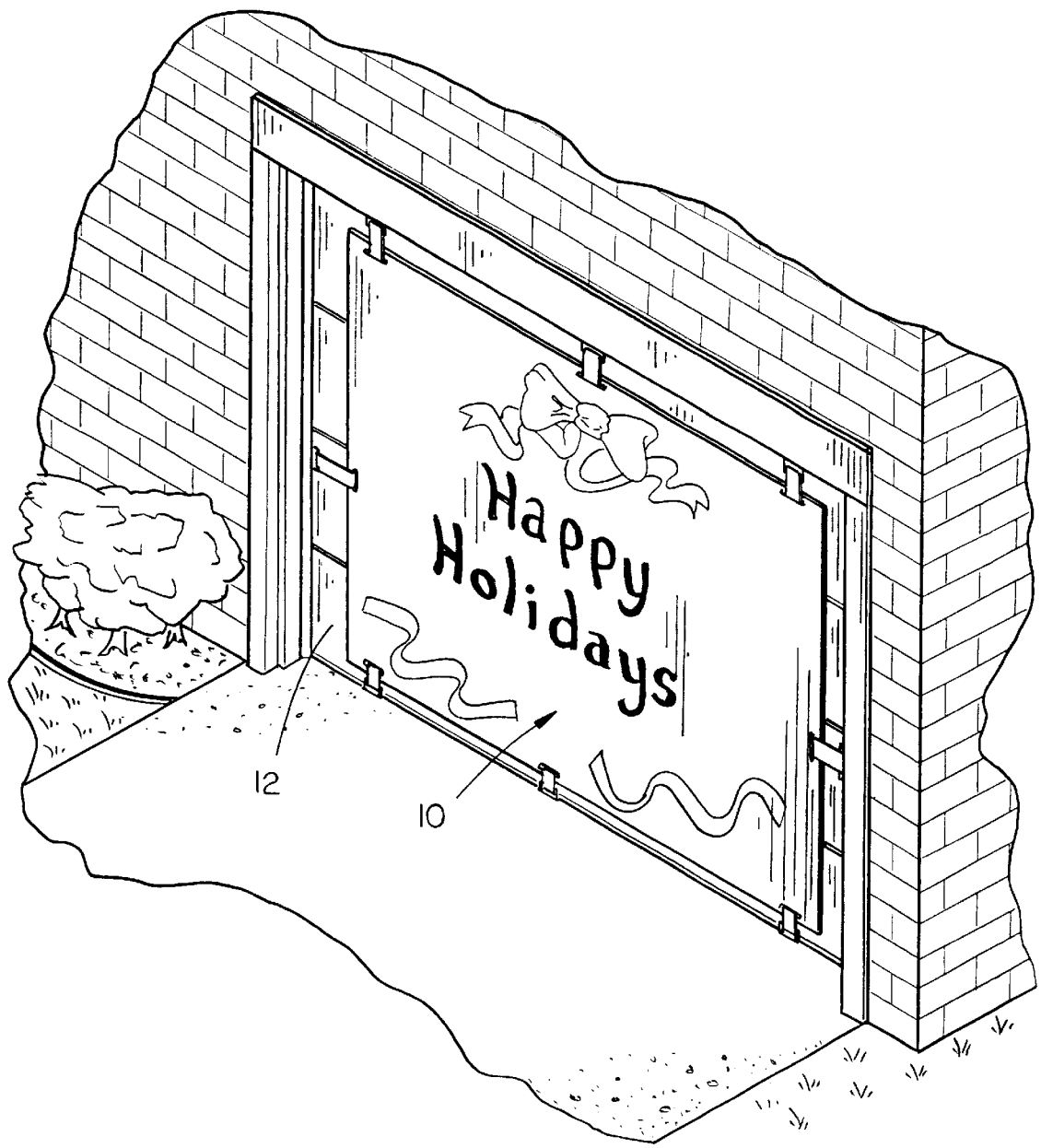
FIG. 1 is a perspective view of an exemplary embodiment of the present invention illustrating the present invention installed on a conventional garage door.

With reference to FIG. 1 there is shown an advertising banner 10 for a garage door 12 of the type having only one or a plurality of door segments or panels. The advertising banner 10 is made of preferably weather-resistant material (such as an ultraviolet resistant polymer sheet material 30). As shown, the banner 10 is sized smaller than the garage door 12 to allow the banner to be attached to the top 14 and bottom 16 edges of the garage door 12.

Figure 3:
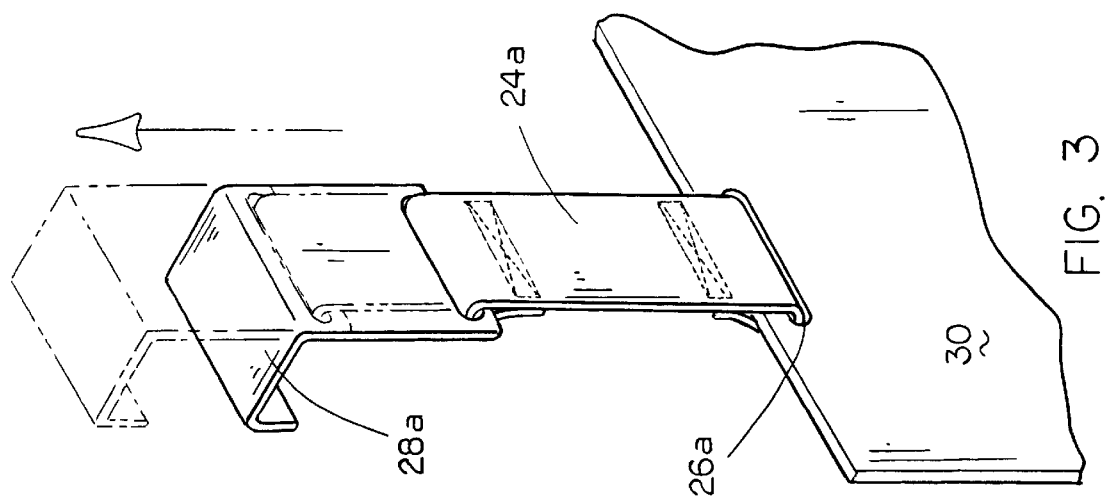
FIG. 3 is a perspective view of an exemplary door attachment member as illustrated in FIG. 2 showing the preferred U-shaped clip, elastic member, and elastic member/banner attachment.
Figure 2:
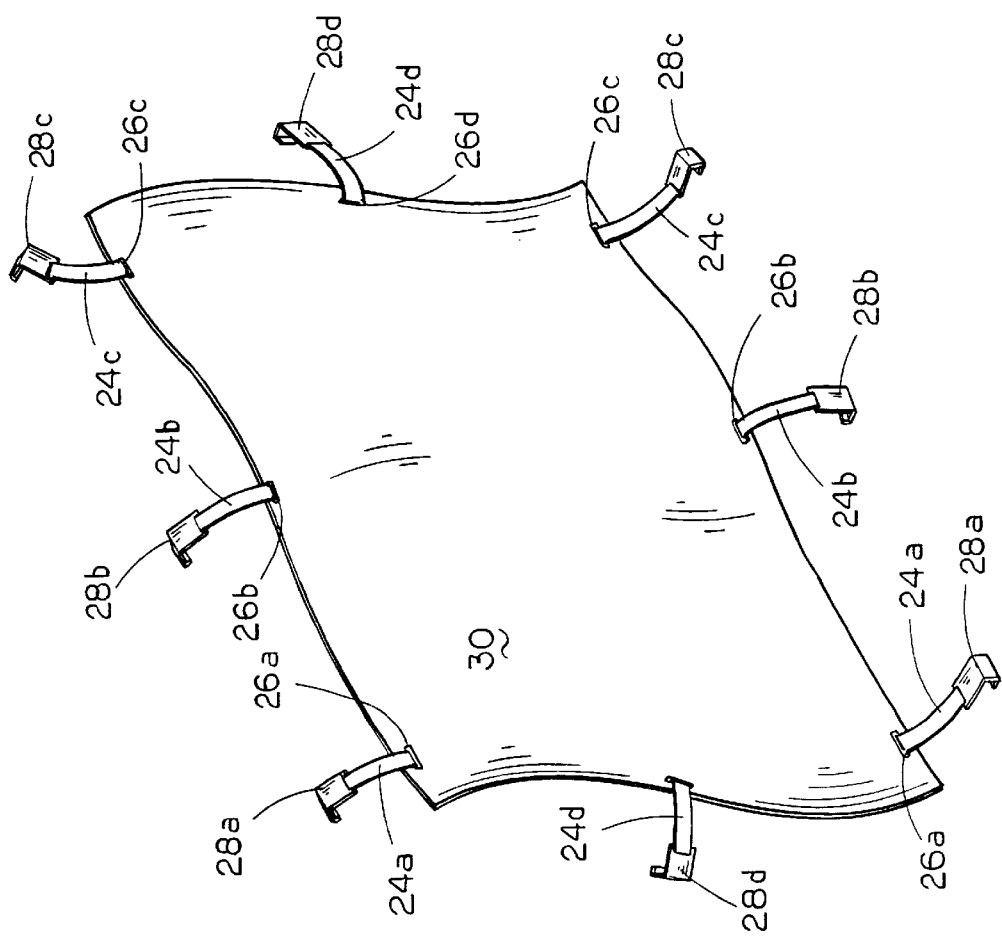
FIG. 2 is a perspective view of an exemplary embodiment of the banner ready for installation on a conventional garage door.
Figure 5:
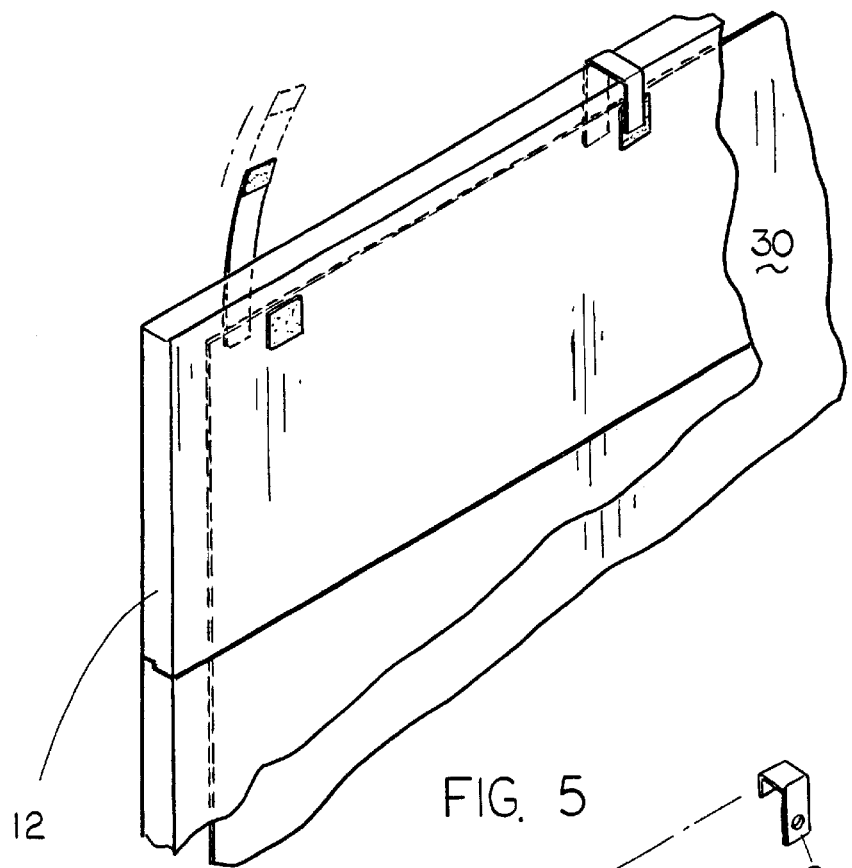
FIG. 5 is a perspective view of a second embodiment of the present invention illustrating hook-and-loop fasteners for securing the sheet material 30 to a garage door 12 via the generally U-shaped retention clips 28.
Figure 6:
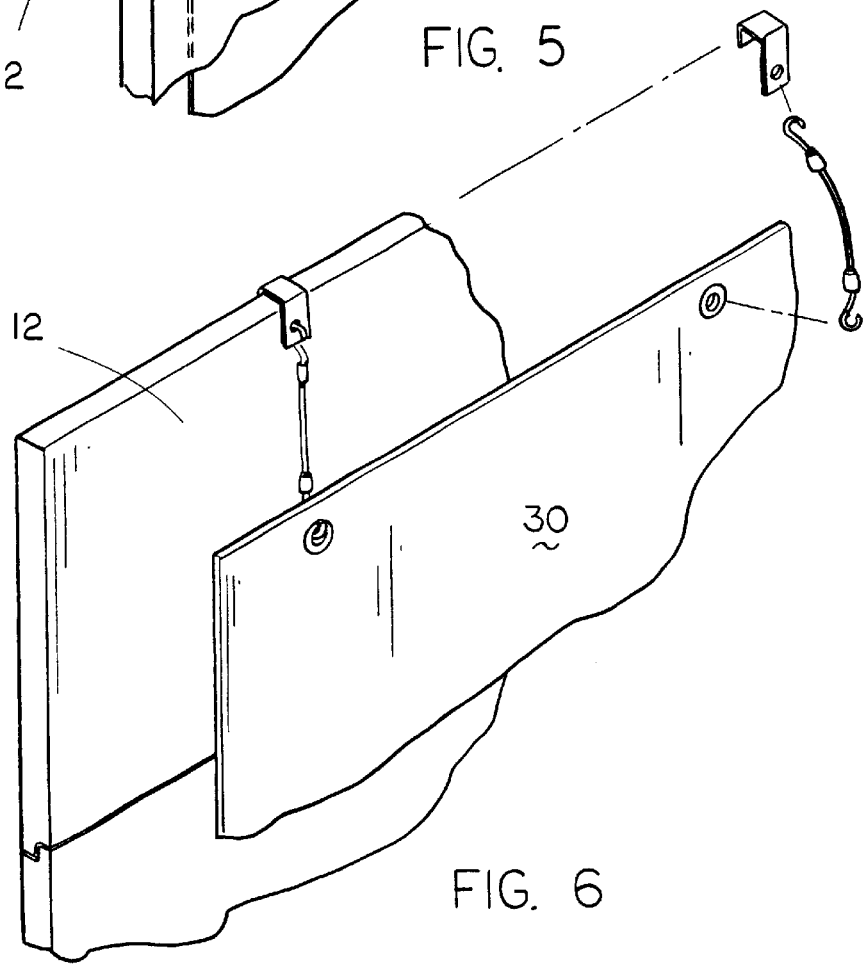
FIG. 6 is a perspective view of a third embodiment of the present invention illustrating the use of bungee type connectors for securing the sheet material 30 to a garage door 12 via the generally U-shaped retention clips 28.

The banner 10 includes top elastic strip members (24a, 24b, and 24c) which are preferably attached via a hook-and-loop fastener (grommet, stitching, adhesive, or the like) to the top edge of the banner 10 near the top banner left corner 26a near the top banner center 26b and near the top banner right corner 26c. The ends of the elastic strips (24a, 24b, and 24c) not attached to the banner are attached to generally flat U-shaped door retention clips (28a, 28b, and 28c). The elastic strips (24a, 24b, and 24c) may be attached to the generally flat U-shaped door retention clips (28a, 28b, and 28c) via a hook-and-loop fastener (grommet, stitching, adhesive or the like). The generally flat U-shaped door retention clips (28a, 28b, and 28c) are preferably fabricated from a durable polymer, aluminum (Al) alloy, or steel. Preferably the generally flat U-shaped door retention clips (28a, 28b, and 28c) are less than 5.0 mm thick, and approximately 3.0 cm wide. The generally flat U-shaped door retention clips (28a, 28b, and 28c) may also be fabricated from a durable wire bent to form a U-shaped hook. Such wire is preferably less than 20 gauge (FIGS. 2 and 3).

The banner 10 includes bottom elastic strip members (24a, 24b, and 24c) are preferably attached via a hook-and-loop fastener (grommet, stitching, adhesive or the like) to the top edge of the banner 10 near the bottom banner left corner 26a, near the bottom banner center 26b, and near the bottom banner right corner 26c. The ends of the elastic strips (24a, 24b, and 24c) not attached to the banner 10 are attached to generally flat U-shaped door retention clips (28a, 28b, and 28c). The elastic strips (24a, 24b, and 24c) may be attached to the generally flat U-shaped door retention clips (28a, 28b, and 28c) via ahook-and-loop fastener (grommet, stitching, adhesive or the like). The generally flat U-shaped door retention clips (28a, 28b, and 28c) are preferably fabricated from a durable polymer, aluminum (Al) alloy, or steel. Preferably the generally flat U-shaped door retention clips (28a, 28b, and 28c) are less than 5.0 mm thick, and approximately 3.0 cm wide. The generally flat U-shaped door retention clips (28a, 28b, and 28c) may also be fabricated from a durable wire bent to form a U-shaped hook. Such wire is preferably less than 20 gauge (FIGS. 2 and 3).

Turning now to FIG. 4, wherein an illuminated banner 100 is illustrated, the banner 100 includes an associated battery pack (or power source) 102, a light source (or a plurality of light source where fiber-optic cable is not utilized) 104, and a plurality of fiber-optic cables 106 operably associated with the light source 104 and eminating from the light source 104 in a decorative or informative pattern about the surface of the banner 100. A chromatic wheel (or cell) 108 or other wavelength altering filter may also be employed so as to provide a multi-colored banner decorative or informative motif.

The invention has been described with reference to the preferred embodiments thereof, which are illustrative and not limiting. Various changes may be made without departing from the spirit and scope of the invention as defined in the claims. For example, where a message may need to be changed, e.g., "FOR SALE" to "SOLD", or from "FOR SALE" to "OPEN HOUSE", the latter message may be removably applied over the existing message.

What is claimed is:

1. A garage door banner, comprising:

(a) a sheet material having a top edge and a bottom edge, said sheet material being sized and shaped to cover at least a portion of a front of a conventional garage door;

(b) at least one of a decorative or informative imprint on said sheet material;

(c) at least three flexible top strips, each of said flexible top strips having a first end attached to said top edge of said sheet material, and a second end attached to a garage door edge retention clip;

(d) at least three flexible bottom strips, each of said flexible bottom strips having a first end attached to said bottom edge of said sheet material, and a second end attached to a garage door edge retention clip; and (e) an illumination source for illuminating said imprint on said sheet material.

2. An illuminated garage door banner, comprising:

(a) a sheet material having a top edge and a bottom edge, said sheet material being sized and shaped to cover at least a portion of the front of a conventional garage door;

(b) at least one of a decorative or informative imprint on said sheet material;

(c) at least two flexible top strips, each of said flexible top strips having a first end attached to said top edge of said sheet material, and a second end attached to a garage door edge retention clip;

(d) at least two flexible bottom strips, each of said flexible bottom strips having a first end attached to said bottom edge of said sheet material, and a second end attached to a garage door edge retention clip; and (d) an illumination source operably associated with said sheet material for illuminating at least some portion of said sheet material.

3. The illuminated garage door banner of claim 2, wherein said imprint includes at least one of the following, a Christmas tree, a Santa Claus, an Easter egg, a baby, a stork, a jack-o-lantern, a grim reaper, a monster, a ghost, an elf, a turkey, a horn-a-plenty, a heart, a Valentine, and a Cupid.

4. The illuminated garage door banner of claim 2, wherein said imprint includes at least one of the following messages, FOR SALE, FOR RENT, OPEN HOUSE, INQUIRE WITHIN, HAPPY HOLIDAYS, MERRY CHRISTMAS, HAPPY HALLOWEEN, VETERAN'S DAY, YOM KIPPER, HAPPY CHANUKAH, HAPPY NEW YEAR, IT'S A BOY, and IT'S A GIRL.

5. The illuminated garage door banner of claim 2, wherein said illumination source includes a battery, a light source, and a garage door attachment member.

6. The illuminated garage door banner of claim 5, wherein said illumination source further includes at least two fiber-optic cables.

7. The illuminated garage door banner of claim 6, wherein said illumination source further includes a chromatic cell for changing the color of light illuminating from at least one of said fiber optic cables.

* * * * *